United States Patent [19]

Cannon

[11] Patent Number: 5,116,446
[45] Date of Patent: May 26, 1992

[54] METHOD OF MAKING A PAPER OVERLAID STRUCTURE

[75] Inventor: Charles G. Cannon, Beaverton, Oreg.

[73] Assignee: Contact Lumber Company, Portland, Oreg.

[21] Appl. No.: 653,858

[22] Filed: Feb. 8, 1991

Related U.S. Application Data

[63] Continuation of Ser. No. 196,071, May 18, 1988, abandoned.

[51] Int. Cl.⁵ .......................... C09J 5/02; B32B 31/26
[52] U.S. Cl. ........................ 156/307.4; 156/307.5; 156/307.7; C09J/5/02; B32B/31/26
[58] Field of Search ............... 428/425.1, 530, 537.1; 156/307.4, 307.7, 312

[56] References Cited

U.S. PATENT DOCUMENTS

| | | | |
|---|---|---|---|
| 3,551,272 | 12/1970 | Ash et al. | 428/530 |
| 3,666,593 | 5/1972 | Lee | 156/285 |
| 4,083,743 | 4/1978 | Degens | 156/278 |
| 4,158,713 | 6/1979 | Degens | 428/212 |
| 4,263,373 | 4/1981 | McCaskey, Jr. et al. | 428/531 |
| 4,541,880 | 9/1985 | Arena et al. | 156/94 |
| 4,844,764 | 7/1989 | Nablo et al. | 156/275.5 |

FOREIGN PATENT DOCUMENTS 57-117954 7/1982 Japan .................. 156/307.4

OTHER PUBLICATIONS

Apr., 1987 Brochure of Reichhold Chemicals, Inc. on Metron Medium Density Overlay.

Primary Examiner—George F. Lesmes
Assistant Examiner—Christopher Brown
Attorney, Agent, or Firm—Eugene M. Eckelman

[57] ABSTRACT

An overlay is saturated with resin and the resin is then partially cured. A resin coating is then applied to one surface of the paper overlay and the overlay is hot pressed apart from its substrate at temperatures and pressures to cure the resin. The resin treated laminate is then secured to the substrate at low temperatures and pressures. The high temperature and pressure curing conditions required for fully curing the resin and forming a high density surface do not result in the transfer of imperfections from the substrate to the surface of the overlay since such curing is accomplished apart from the substrate. Initial resin saturation of the overlay is of a selected percent by weight to accomplish the desired resin treatment as well as to provide a porous bonding surface to the substrate.

1 Claim, 1 Drawing Sheet

METHOD OF MAKING A PAPER OVERLAID STRUCTURE

This application is a continuation of application Ser. No. 07/196,071, filed May 18, 1988 abandoned.

BACKGROUND OF THE INVENTION

This invention relates to the formation of a paper overlaid product, and more particularly relates to the formation of a paper overlaid product which uses solid wood or similar unstable type base portion as the substrate, and to the product formed thereby.

Paper overlaid wood products have heretofore been manufactured for various purposes. Such products are formed by pressing an overlay onto a substrate at elevated temperatures and pressures to cure the resin and form a smooth, hard surface for various purposes, such as to increase weatherability and durability, hardness, paintability, chemical resistance and other purposes. For example, U.S. Pat. No. 4,541,880 is directed to overlaid plywood panels manufactured by affixing one or more sheets of thermosetting resin-impregnated fiber overlay paper to one or both sides of he panels at temperatures of from 250° F. to 300° F. and pressures of from 150 to 250 psi. U.S. Pat. No. 3,666,593 is directed to a paper overlaid panel that uses a particular group of thermosetting resins serving both as the impregnant and the adhesive, such resins being applied at around 300° F. and pressures of 150 psi and up. Some overlays are applied at greatly elevated temperatures and pressures, such as illustrated in U.S. Pat. No. 4,263,373 wherein temperatures range up to 200° C. and pressures up to 2,000 psi.

Although resin impregnated paper overlays can be pressed onto the more stable substrates such as plywood or other pressed products at elevated temperatures and pressures while curing the resin and at the same time achieve a reasonably good surface, as seen in the prior patents, such overlays cannot be satisfactorily similarly pressed onto unstable substrates, for example, solid wood, at elevated temperatures and pressures since imperfections develop in the finished product. That is, when solid wood for instance is subjected to elevated temperatures and pressures for applying a resin treated overlay thereto, pitch can bleed from the substrate through the overlay, thus causing surface contamination, a surface that is unsuitable for painting, and a surface that is not easily cleaned. Also, subjecting solid wood to hot pressing and high pressures causes thickness variation in the final product and also an uneven surface thereon due to varying densities inherent in the substrate. Furthermore, the hot pressing and high pressures required to cure the resins cause surface imperfections in the substrate which can telegraph through the overlay.

SUMMARY OF THE INVENTION

According to the present invention and forming a primary objective thereof, a method is employed which is particularly adaptable for applying paper overlays to solid wood substrates and at the same time a method which eliminates surface contamination, thickness variation, uneven surfaces, and telegraphing of surface imperfections through the overlay.

Another object is to provide an improved product constructed according to the steps of the method.

In carrying out the invention, the method comprises the formation of an architectural product of a type associated with a solid wood or similar type unstable substrate. The steps comprise first saturating a paper, such as Kraft paper, with a thermosetting resin. This saturated paper is then partially cured. Subsequent to such partial curing, a thermosetting resin coating is applied to one surface of the paper. This coated paper is then hot pressed apart from the substrate to which it is to be applied. This hot pressing cures the resin and forms a hard, smooth resin surfaced laminate. The laminate is then secured to one surface of the substrate by adhesive bonding which can be cured by RF or other methods at room temperature, such bonding being accomplished at low pressured. In the method of the invention, the resin paper saturation step is carried out in a content by weight which will be less than the resin content by weight of the coating since it is desired that the saturation step merely accomplish an initial overall saturation, and one which allows the paper to remain sufficiently porous to form a good bondable surface with a substrate, but the coating step must accomplish a hard, smooth non-absorbent surface.

The invention will be better understood and additional objects and advantages will become apparent from the following description taken in connection with the accompanying drawings.

DETAILED DESCRIPTION OF PREFERRED EMBODIMENTS

Figure 2:
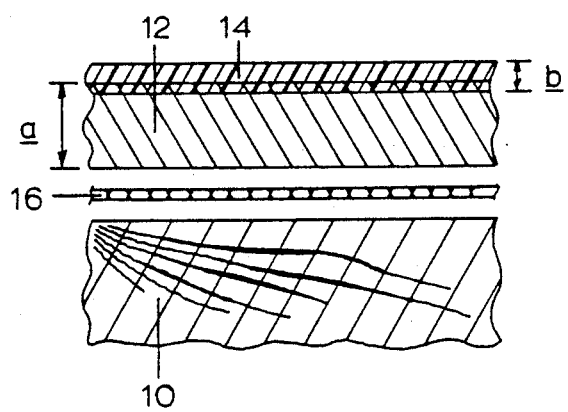
FIG. 2 is an exploded, enlarged fragmentary sectional view showing the formation of a paper overlaid solid wood product of the invention, this view showing the layup of a single thickness laminate.

With reference first to FIG. 2, the numeral 10 designates a substrate with which the present invention may be concerned. More particularly, the invention is designed for use with unstable type substrates and particularly softer type solid woods, such as pine, which have found extensive use for architectural purposes of a type to which a resin treated overlay has novel combination therewith. Although the present method is usable with a stable type substrate such as plywood and pressed boards, its primary purpose is to provide improvements in paper overlaid solid wood substrates.

Figure 1:
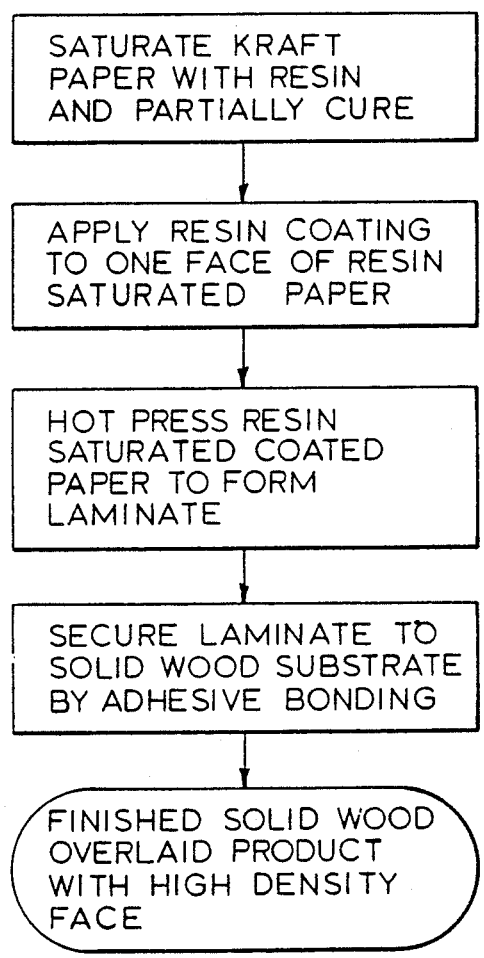
FIG. 1 is a flow chart illustrating major steps in performing the present invention.

The numeral 12 represents in greatly exaggerated thickness a layer of overlay material preferably comprising Kraft paper. With reference to the flow chart of FIG. 1, a first step of the method comprises saturating the paper 12 with a thermosetting resin and partially curing the resin. In the next step of the method, a thermosetting resin coating 14 is applied to one face of the resin saturated overlay 12. The overlay as saturated and coated is then hot pressed apart from its substrate at the proper temperatures, pressures, and times to cure the resin and form a laminate. These steps are carried out by conventional means, namely, the paper is provided with the resin saturation in a suitable vat. Thereupon, the saturated paper is subjected to suitable and conventional means for partially curing the resin. The resin coating 14 is thereafter applied by suitable and conventional means and the resin saturated and coated sheet is now ready for hot pressing into a laminate at elevated temperatures and pressures to fully cure the resin.

The laminate will be fully saturated throughout its thickness by the first resin treatment step and the resin coating 14 will penetrate partly into the paper and also provide a top coating. The reference character a designates the paper thickness and the reference character b designates approximately the thickness of the resin 14 including its saturation depth thereof into the paper and its surface coating.

The formation of the laminate with its first resin saturation step and its coating 14 is accomplished at recommended curing conditions of the resin used. Effective thermosetting resins may comprise the phenolic or melamine resins and when cured at the proper temperature and pressures will form a laminate having a surface with the desired qualities. These types of resins are cured at approximately 300° F. and 200 psi for 6–8 minutes. It is to be understood that other types of resins may be used and that the curing conditions may vary somewhat according to the recommended values.

As stated above, the resin content per weight of the coating 14 is greater than the resin content per weight of the initial saturation of the paper to provide the desired surface coating 14 and an opposite surface of the laminate which has sufficient porosity for accomplishing a good bond to the substrate at low temperatures and pressures. A desired proportion of resin content of the coating 14 to the saturating resin is approximately 55% by weight for the coating resin and approximately 35% by weight for the saturating resin.

After suitable resin treatment and curing of the paper to form the laminate, the opposite porous surface of the paper from the coating 14 is bonded to a surface of the substrate. Such is accomplished by an adhesive layer 16 of suitable adhesive such as iso-cyanate of a type sold on the market under the trade name Iso-Set. Importantly, this step of the method is performed at low temperatures and pressures, such as room temperature and pressures of approximately 130 psi. or less. The present method thus avoids pressing of the laminate onto the substrate at elevated temperatures and pressures.

Figure 3:
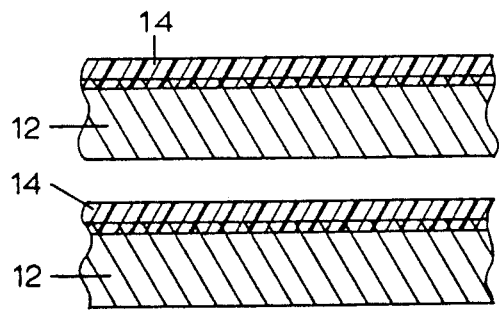
FIG. 3 is a view similar to FIG. 2 but showing a step in a process of manufacturing a multiple thickness laminate.

With reference to FIG. 3, the same general concept of the invention is involved in constructing laminates of different thickness. That is, if a single thickness laminate is not sufficient to provide a good surface, two or more of the sheets of paper in their partially cured resin condition can be coated with the coating 14 and hot pressed together into a single laminate. FIG. 3 shows two of such sheets just prior to hot pressing into a single laminate. After hot pressing, the thickened multiple sheet laminate will have the desired high density face surface and will have the opposite absorbent surface for bonding to the substrate. The number of sheets combined in a laminate is determined by the extent of imperfections in the surface of the substrate, namely, the greater the number or size of the imperfections, the more paper sheets that are combined.

EXAMPLE

As one example of the invention, Kraft paper of 132 lb basis weight was saturated in a vat at approximately 35% by weight resin content. Upon removal from the vat, the saturated paper was partially cured to a state to allow the sheet to be handled. Coating layer 14 was subsequently applied at a resin content of approximately 55% by weight. This overlay was then hot pressed apart from tis substrate for approximately 6 to 8 minutes at 300° F. and 200 psi. It was then cooled for a time sufficient to set the resin and preferably at a low pressure to provide a stable flat laminate. Thereupon the stable flat laminate was secured to the substrate by the use of Iso-Set adhesive at room temperature and at a pressure less than 130 psi.

The particular method of carrying out the resin impregnation of the paper and by hot pressing it apart from its substrate eliminates transferring of imperfections from the substrate to the surface of the laminate. Thus, the method provides a high density overlay surface which has good weatherability and durability as well as hardness, paintability, and chemical resistance. At the same time, pitch in the wood will not bleed through the overlay and cause surface contamination. Also, without the use of hot pressing in association with the substrate, there is no thickness variation in the final wood product or the development of uneven surfaces due to varying wood density across the product. Furthermore, imperfections which ordinarily telegraph through the overlays when such overlays are associated with hot pressing are non-existent.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. The method of forming an architectural product having a solid wood substrate and a multiple layer resin treated paper overlay therefor comprising first treating at least two sheets of paper overlay with a thermosetting resin in an identical manner, the treating of said sheets of paper comprising a first step of saturating said sheets with thermosetting resin in a content per weight of approximately 35%, partially curing said resin, applying a thermosetting resin coating to one surface of said sheets in a content per weight of approximately 55%, laying said sheets of overlay paper up in a multiple layer arrangement at a time when the saturating resin is in said partially cured condition, not pressing said sheets of overlay paper while in their multiple layer arrangement to fully cure the saturating and coating resin to form a smooth and hardened face surface for said architectural product and a porous bondable surface on the surface opposite from said face surface, said porous bondable surface of a first sheet of overlay paper providing a bonding connection between said porous bondable surface of said first sheet of overlay paper and the smooth and hardened face surface of a second sheet of overlay paper in said multiple layer arrangement, and then adhesively securing the said porous bondable surface of said second sheet of overlay paper directly to a surface of said substrate by low temperature and pressure bonding.

* * * * *